United States Patent
Lee (10) Patent No.: US 6,669,604 B1
(45) Date of Patent: Dec. 30, 2003

(54) TRANSMISSION DEVICE FOR AN ELECTRIC CYCLING EXERCISER

(76) Inventor: Chin-Tsun Lee, No. 32, Lane 6, Kuokuang 7th St., Yung Kang City, Tainan Hsien (TW)

( * ) Notice: Subject to any disclaimer, the term of this patent is extended or adjusted under 35 U.S.C. 154(b) by 0 days.

(21) Appl. No.: 10/337,021

(22) Filed: Jan. 6, 2003

(51) Int. Cl.[7] .............................................. A63B 22/06
(52) U.S. Cl. .......................................... 482/57; 482/60
(58) Field of Search ........................ 482/51–53, 57–65; 601/23, 34, 35, 36

(56) References Cited

U.S. PATENT DOCUMENTS

| | | | | |
|---|---|---|---|---|
| 4,477,072 A | * | 10/1984 | DeCloux | 482/4 |
| 4,550,906 A | * | 11/1985 | Im | 482/57 |
| 5,580,337 A | * | 12/1996 | Habing et al. | 482/57 |
| 5,902,215 A | * | 5/1999 | Kuo | 482/57 |
| 5,944,638 A | * | 8/1999 | Maresh et al. | 482/63 |
| 6,132,341 A | * | 10/2000 | Lin | 482/57 |

* cited by examiner

Primary Examiner—Stephen R. Crow
(74) Attorney, Agent, or Firm—Charles E. Baxley (57) ABSTRACT

An electric cycling exerciser includes a housing with a rotatable shaft, two pedals attached to the shaft, a gear mounted on the shaft, and a motor for driving the gear. A safety member is fixed to the shaft and received in the gear. The gear includes at least one groove for receiving an elastic element and an insert. The safety member includes at least one insertion groove for receiving the insert. The insert is biased by the elastic element into the groove, allowing the gear and the shaft to turn jointly. When a user's foot is stuck between a respective pedal and the housing or the respective pedal is subject to a force greater than an engaging force between the insertion groove and the insert, the insert is disengaged from the insertion groove such that the shaft and the safety member are not turned while the gear is being turned.

8 Claims, 11 Drawing Sheets

TRANSMISSION DEVICE FOR AN ELECTRIC CYCLING EXERCISER

BACKGROUND OF THE INVENTION

1. Field of the Invention

The present invention relates to a transmission device for an electric cycling exerciser.

2. Description of the Related Art

Figure 11:
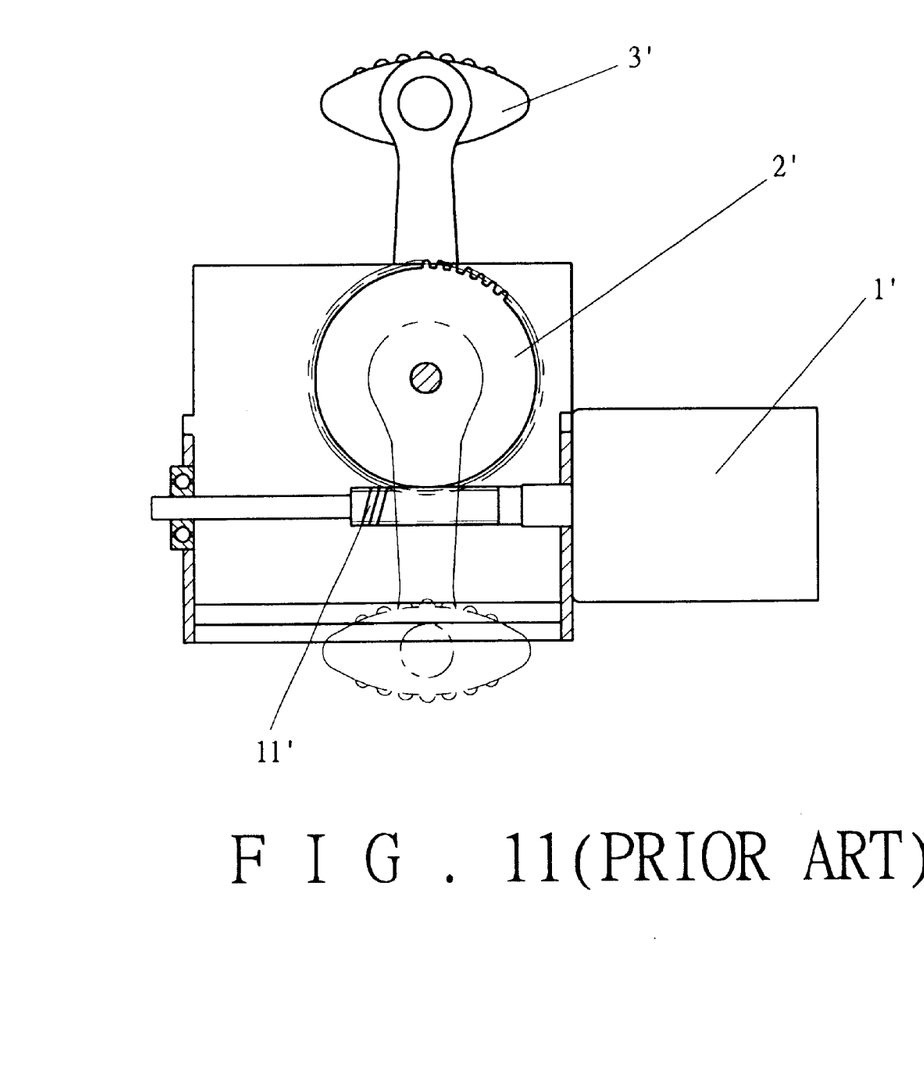
FIG. 11 is a sectional view of a conventional electric cycling exerciser.

Besides poor blood circulation, the body of a person that has sat for hours would become stiff and the person would feel tired. An electric cycling exerciser is provided to exercise the user's legs while the user is sitting or lying down on the floor, thereby improving the blood circulation. FIG. 11 of the drawings illustrates a conventional electric cycling exerciser comprising a motor 1' having an output shaft 11', a gear 2' meshed with the output shaft 11' of the motor 1', and two pedals 3' operably connected to the gear 2'. When the motor 1' is turned on, the pedals 3' are turned. Nevertheless, such an electric cycling exerciser has the following drawbacks. First, when the user's foot has not yet firmly stepped on the respective pedal 3', the user's foot would fall and thus be injured by the turning pedal 3'. The injury is more serious if the foot is stuck, as the motor 1' keeps running. Secondly, if the user's foot steps on the respective pedal 3' with a greater force or drives the respective pedal 3' in a reverse direction, this would feed back to the motor 1' such that the motor 1' could not drive the gear 2' and the respective pedal 3' in a normal condition. As a result, the temperature of the motor 1' would rise and thus cause damage to the motor 1'.

SUMMARY OF THE INVENTION

An object of the present invention is to provide a transmission device for an electric cycling exerciser, the transmission device having a safety member to avoid injury to the user's foot.

In accordance with a first aspect of the invention, an electric cycling exerciser comprises:

a housing;

a shaft rotatably mounted to the housing;

two pedals respectively operably attached to two ends of the shaft;

a motor; and a gear rotatably mounted on the shaft and driven by the motor, the gear including a safety member rotatably mounted therein, the safety member being fixed to the shaft to turn therewith, one of the gear and the safety member including at least one groove for receiving an elastic element and an insert, the other of the gear and the safety member including at least one insertion groove for receiving the insert, the insert being biased by the elastic element into said at least one groove, thereby allowing joint rotation of the gear and the shaft;

wherein when a user's foot is stuck between a respective pedal and the housing or the respective pedal is subject to a force greater than an engaging force between said at least one insertion groove and the insert, the insert is disengaged from said at least one insertion groove such that the shaft and the safety member are not turned while the gear is being turned.

In accordance with a second aspect of the invention, an electric cycling exerciser comprises:

a housing;

a first shaft rotatably mounted to the housing;

a second shaft rotatably mounted to the housing;

two pedals respectively operably attached to two ends of one of the first shaft and the second shaft;

a motor; and a gear train including at least a first gear mounted to the first shaft and a second gear mounted to the second shaft, the first gear being meshed with the second gear, one of the first gear and the second gear being driven by the motor;

one of the first gear and the second gear including a safety member rotatably mounted therein, the safety member being fixed to an associated one of the first shaft and the second shaft to turn therewith, one of said one of the first gear and the second gear and the safety member including at least one groove for receiving an elastic element and an insert, the other of said one of the first gear and the second gear and the safety member including at least one insertion groove for receiving the insert, the insert being biased by the elastic element into said at least one groove, thereby allowing joint rotation of said one of the first gear and the second gear and an associated one of the first shaft and the second shaft;

wherein when a user's foot is stuck between a respective pedal and the housing or the respective pedal is subject to a force greater than an engaging force between said at least one insertion groove and the insert, the insert is disengaged from said at least one insertion groove such that the safety member and an associated one of the first shaft and the second shaft to which the pedals are mounted are not turned.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
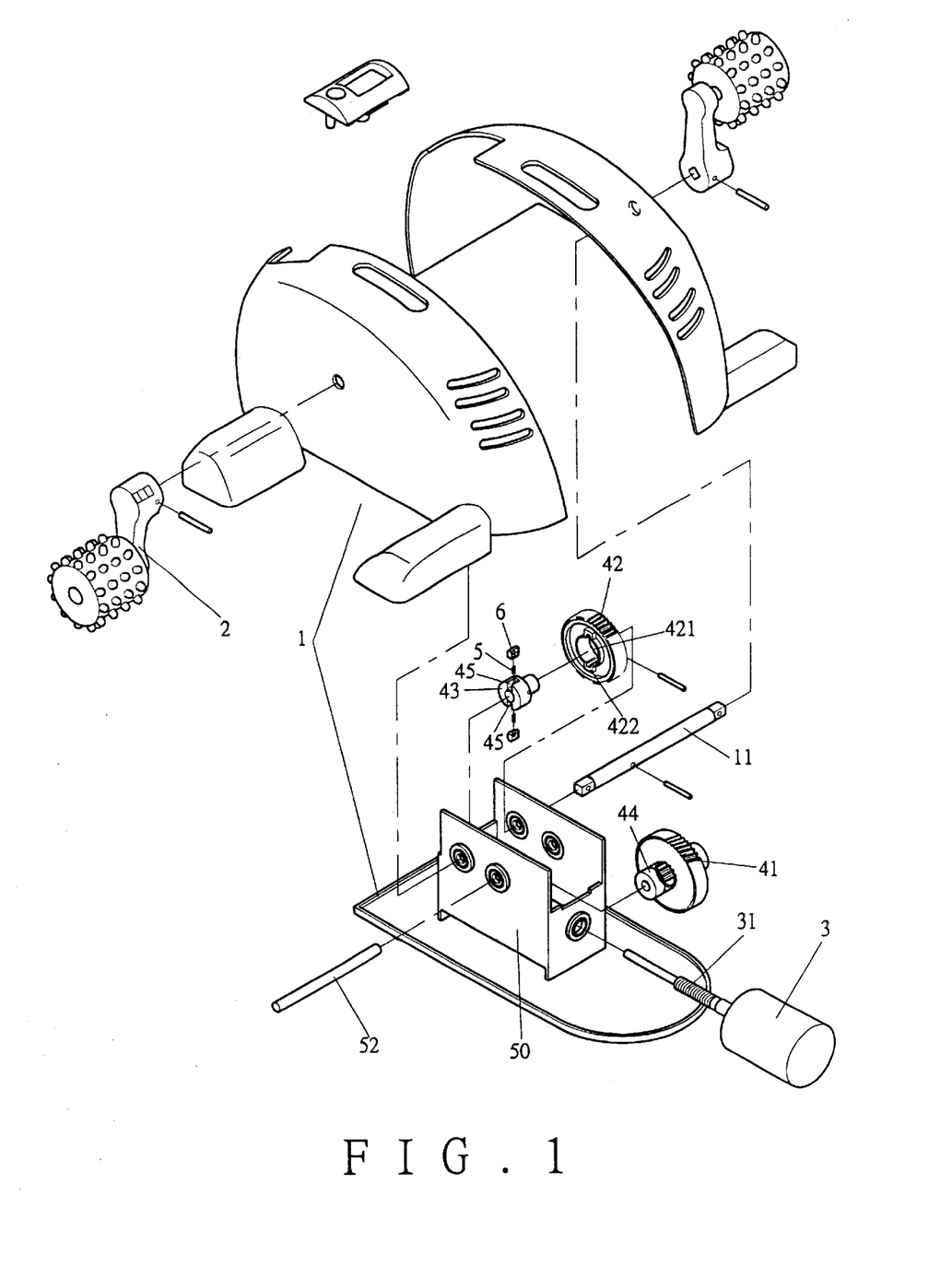
FIG. 1 is an exploded perspective view of a cycling exerciser in accordance with the present invention.
Figure 2:
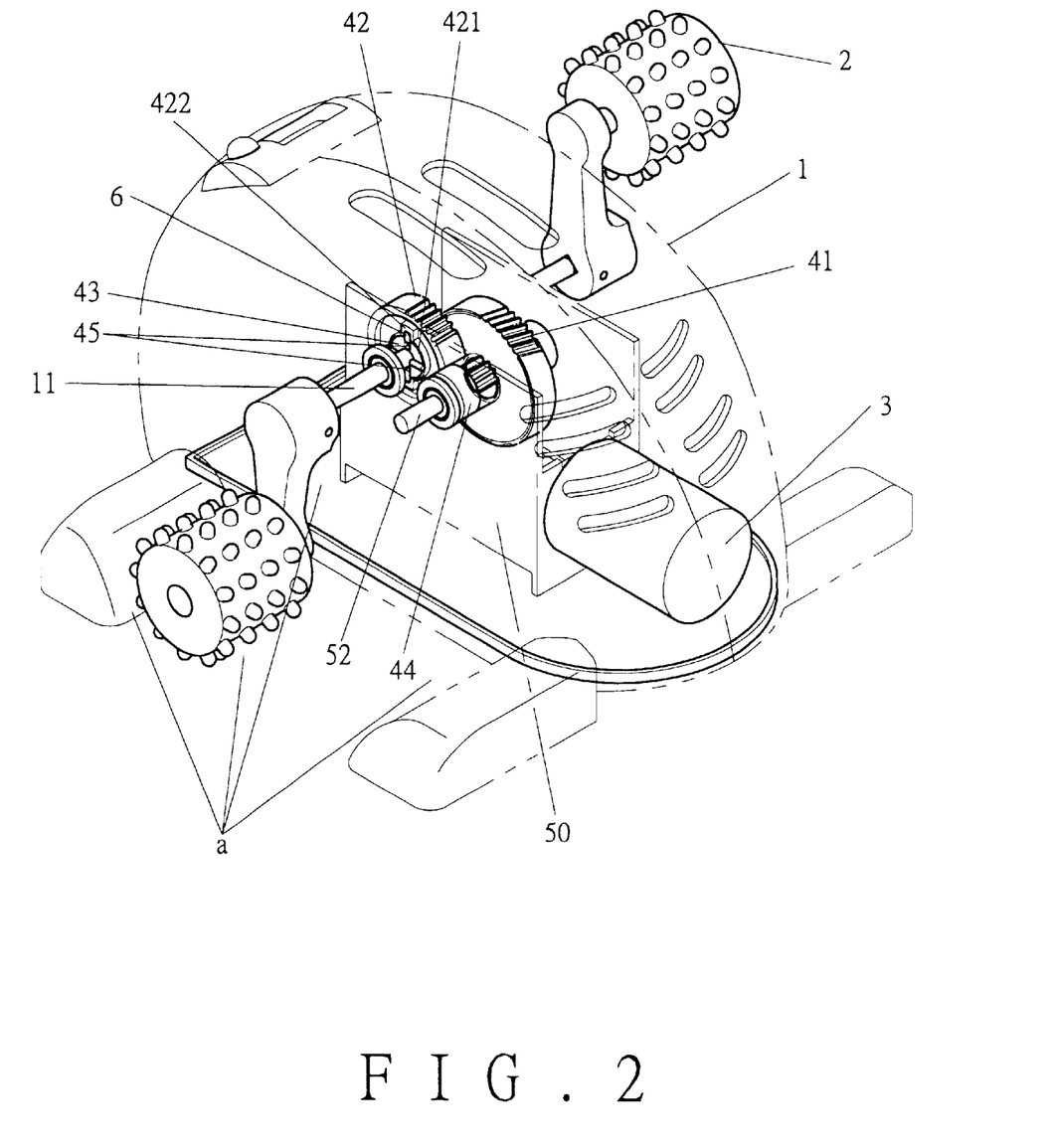
FIG. 2 is a perspective view of the cycling exerciser in accordance with the present invention, wherein the housing of the cycling exerciser is shown in phantom lines to show interior of the cycling exerciser.
Figure 3:
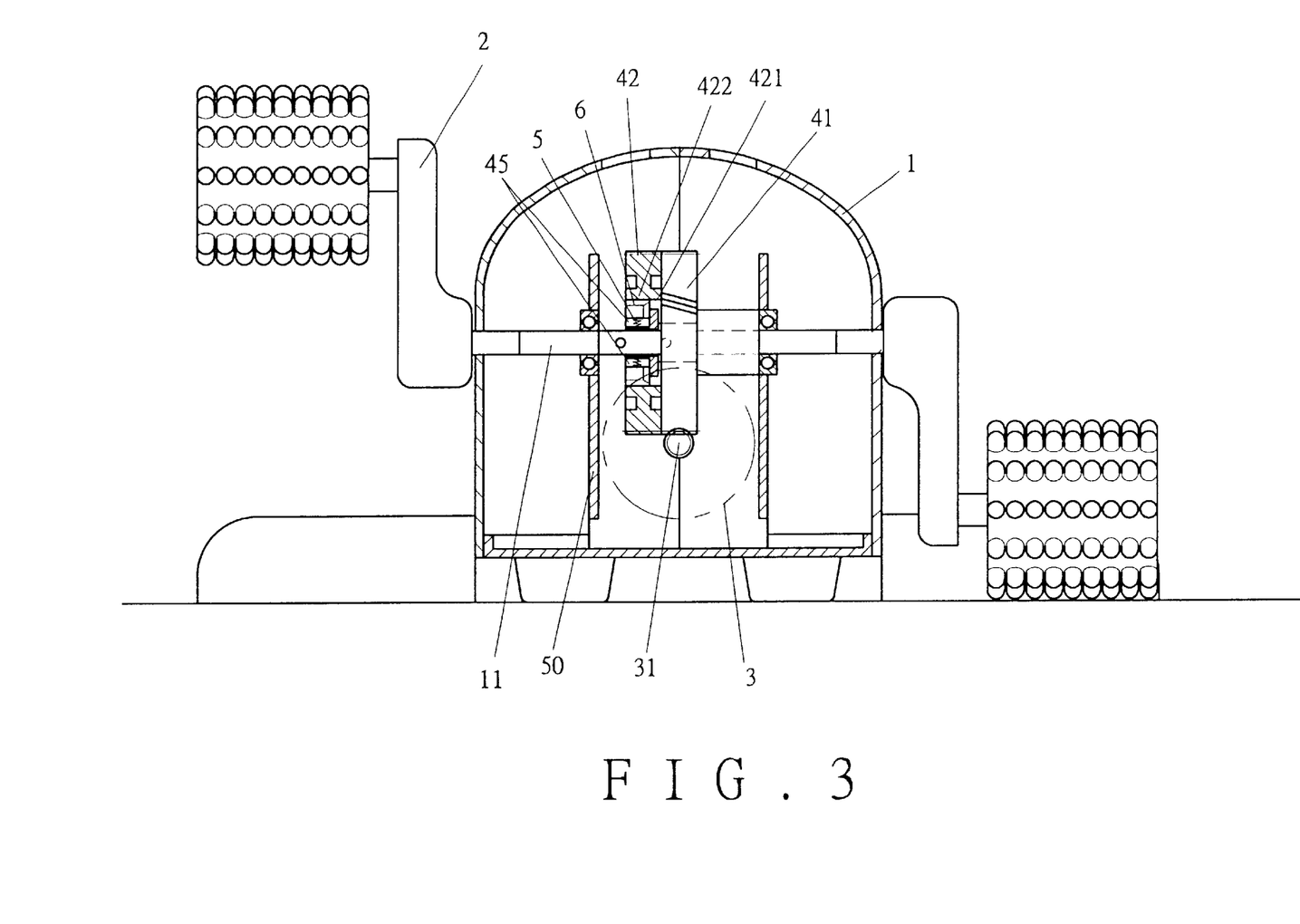
FIG. 3 is a sectional view of the cycling exerciser in accordance with the present invention.

Referring to FIGS. 1 through 3, an electric cycling exerciser in accordance with the present invention generally comprises a housing 1, a pair of pedals 2, a motor 3, and a gear train. A shaft 11 is rotatably mounted to the housing 1 and has two ends to which the pedals 2 are respectively attached through a crank (not labeled) to turn therewith. The motor 3 includes an output shaft 31 for driving the gear train. The output shaft 31 may be in the form of a worm or a threaded rod.

The gear train in this embodiment includes a first gear 41 meshed with the output shaft 31 and a second gear 42. The first gear 41 is rotatably mounted by a shaft 52 to a gear box 50 and includes a reduced portion 44 having a plurality of teeth on an outer periphery thereof. The second gear 42 is rotatably mounted on the shaft 11. The second gear 42 meshes with the reduced portion 44 of the first gear 41. The second gear 42 further includes a central hole 421 for receiving a wheel 43.

The second gear 42 further includes an insertion section. In this embodiment, the second gear 42 has two diametrically disposed insertion grooves 422 in an inner periphery defining the central hole 421 of the second gear 42. The wheel 43 includes a pair of diametrically disposed grooves 45 in an outer periphery thereof, each groove 45 receiving an elastic element 5 and an insert 6 therein. Each elastic element 5 has a first end attached to the wheel 43 and a second end attached to an associated insert 6.

Figure 4:
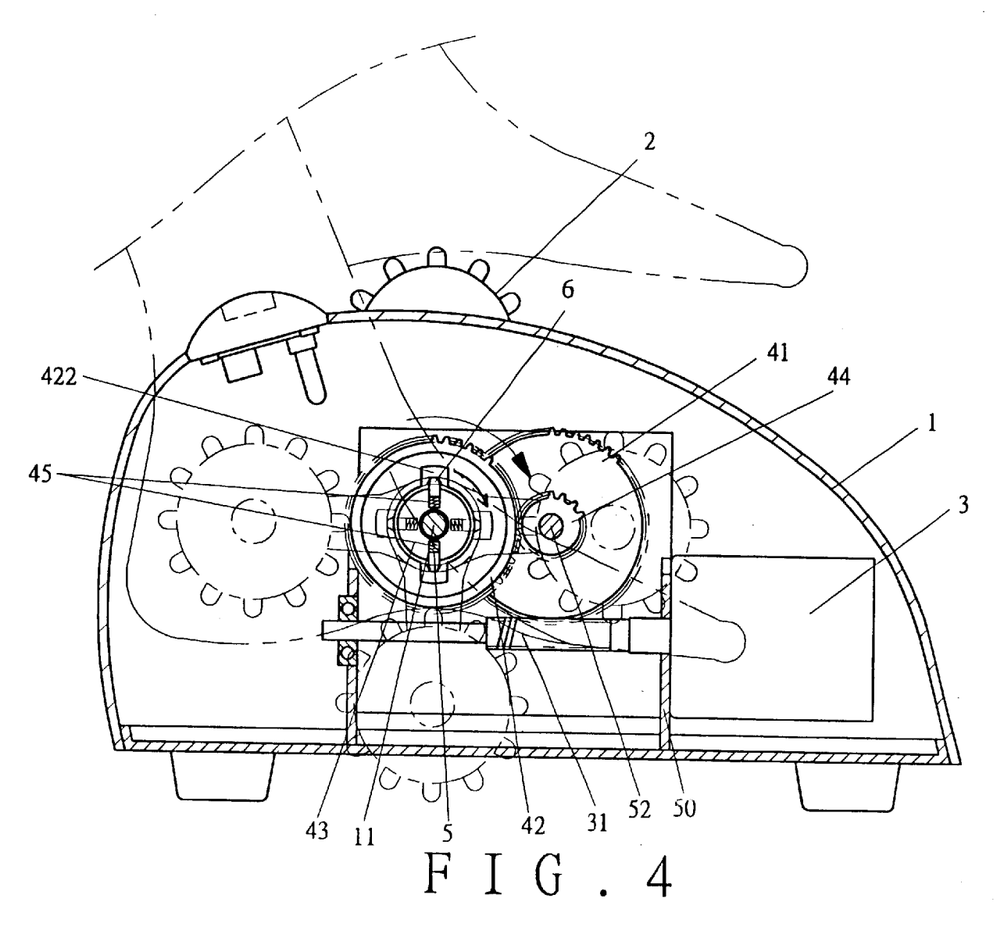
FIG. 4 is another sectional view of the cycling exerciser in accordance with the present invention.

Referring to FIG. 4, each insert 6 is biased by an associated elastic element 5 into an associated insertion groove 422 of the second gear 42. Thus, the wheel 43 is turned together with the second gear 42. As a result, when the motor 3 is turned on, the pedals 2 are turned through transmission by the first gear 41, the second gear 42, and the wheel 43. The user's feet stepping on the pedals 2 are carried and thus exercised.

Figure 5:
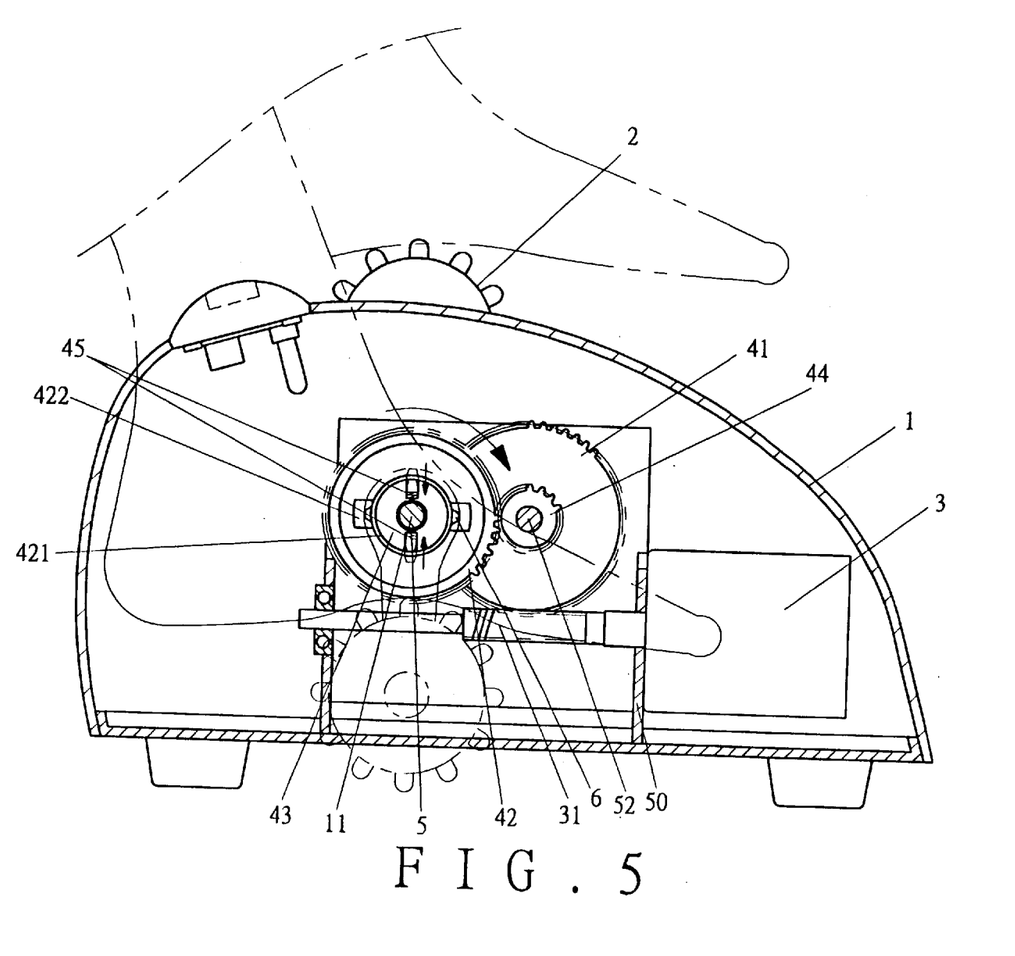
FIG. 5 is a sectional view similar to FIG. 4, wherein the inserts are disengaged from insertion grooves of the cycling exerciser.

Referring to FIGS. 2 and 5, when the user's foot slips from the respective pedal 2 into a gap "a" between the respective pedal 2 and the housing 1, the wheel 43 cannot turn but the second gear 42 keeps turning. Each insertion 6 is so configured that it is disengaged from the associated insertion groove 422 of the second gear 42 when the wheel 43 cannot turn. Thus, the user's foot would not be injured by the pedal 2 due to continuous running of the motor 3, and the second gear 42 turns idly. The wall defining the insertion groove 422 impinges the respective insert 6 and thus sounds to thereby warn the user. The operation of the motor 3 remains the same, eliminating the risk of damage by high temperature.

In a case that the user's foot exerts a force on the respective pedal 2 greater than the engaging force between the insert 6 and the respective insertion groove 422, the insert 6 is disengaged from the respective insertion groove 422. Again, the second gear 42 turns idly without turning the pedals 2, and damage to the motor 3 is avoided. Again, the wall defining the insertion groove 422 impinges the respective insert 6 and thus warns the user by sounds.

Figure 6:
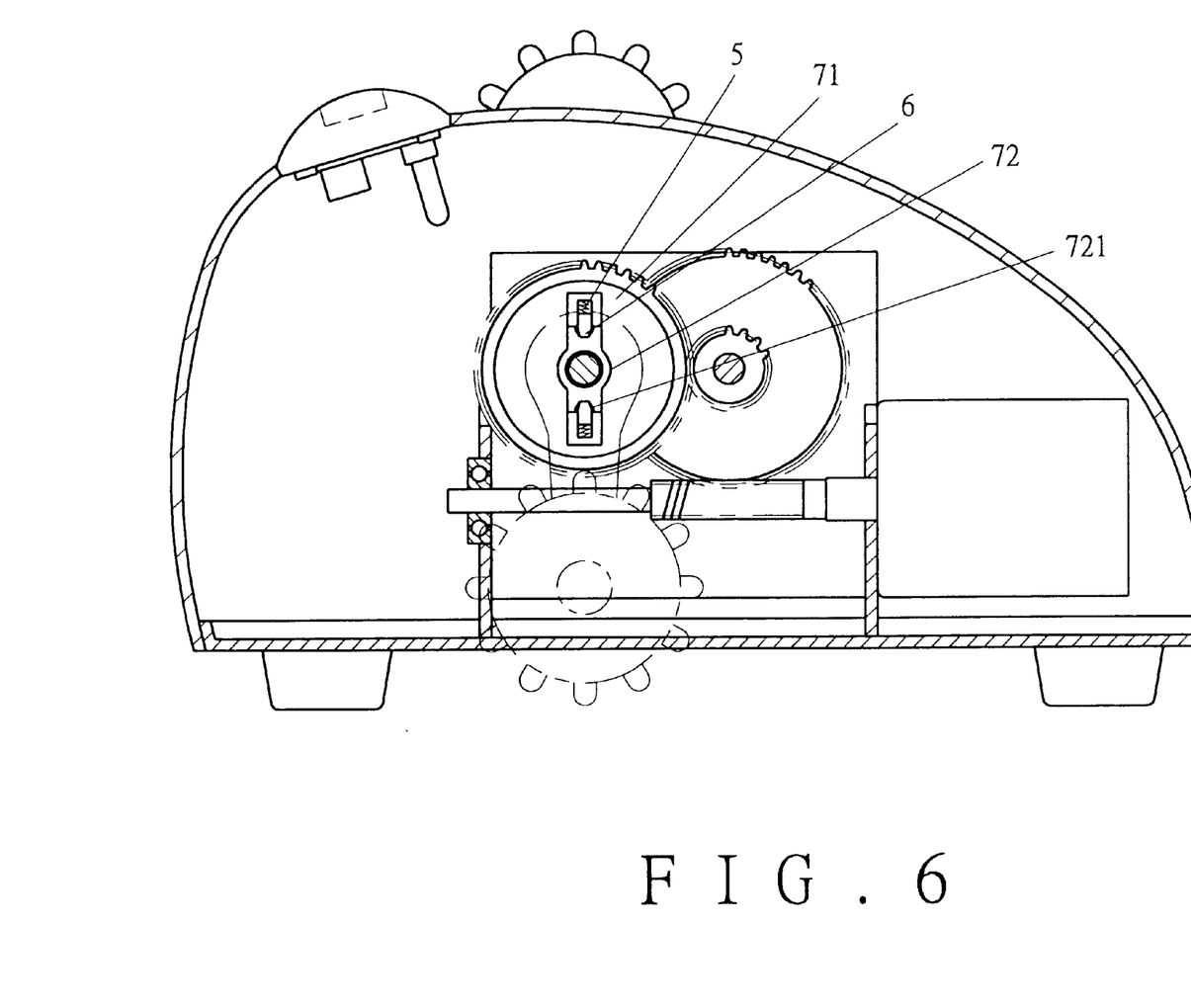
FIG. 6 is a sectional view illustrating another embodiment of the cycling exerciser in accordance with the present invention.

FIG. 6 illustrates another embodiment of the invention, wherein the second gear (now designated by 71) has a wheel 72 received therein. The elastic elements 5 and the inserts 6 are mounted in the second gear 71, and two insertion grooves 721 are defined in the wheel 72. Operation of this embodiment is identical to that of the first embodiment.

Figure 7:
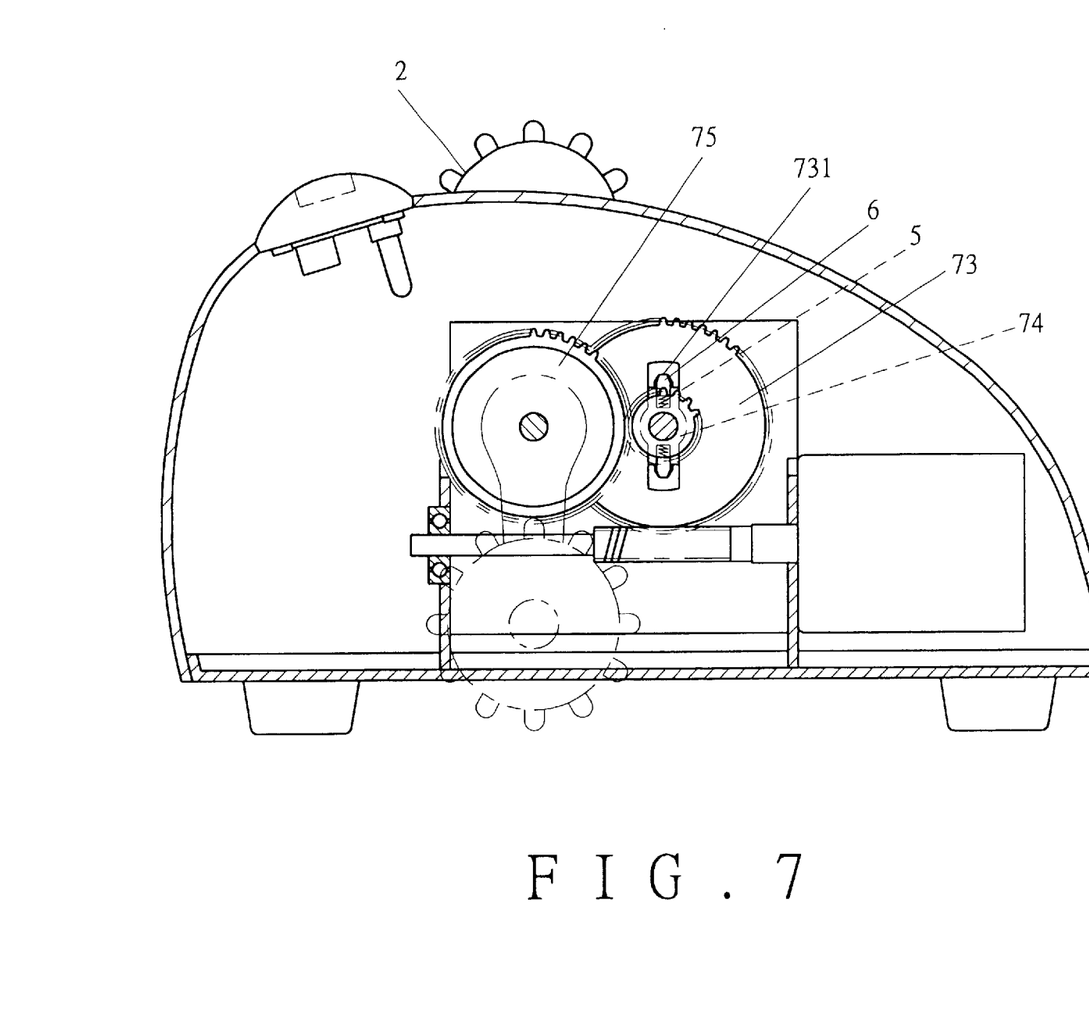
FIG. 7 is a sectional view illustrating a further embodiment of the cycling exerciser in accordance with the present invention.

FIG. 7 illustrates a further embodiment of the invention, wherein the insertion grooves (now designated by 731) are defined in the first gear (now designated by 73), and a wheel 74 is mounted in the first gear 73. The wheel 74 is connected to the second gear (now designated by 75) to which the pedals 2 are operably attached. The elastic elements 5 and the insertions 6 are mounted in the wheel 74 to cooperate with the insertion grooves 731. Operation of this embodiment is identical to that of the first embodiment. Alternatively, the elastic elements 5 and the inserts 6 can be mounted in the first gear 73, and the insertion grooves can be defined in the wheel 74 without adversely affecting its function.

Figure 8:
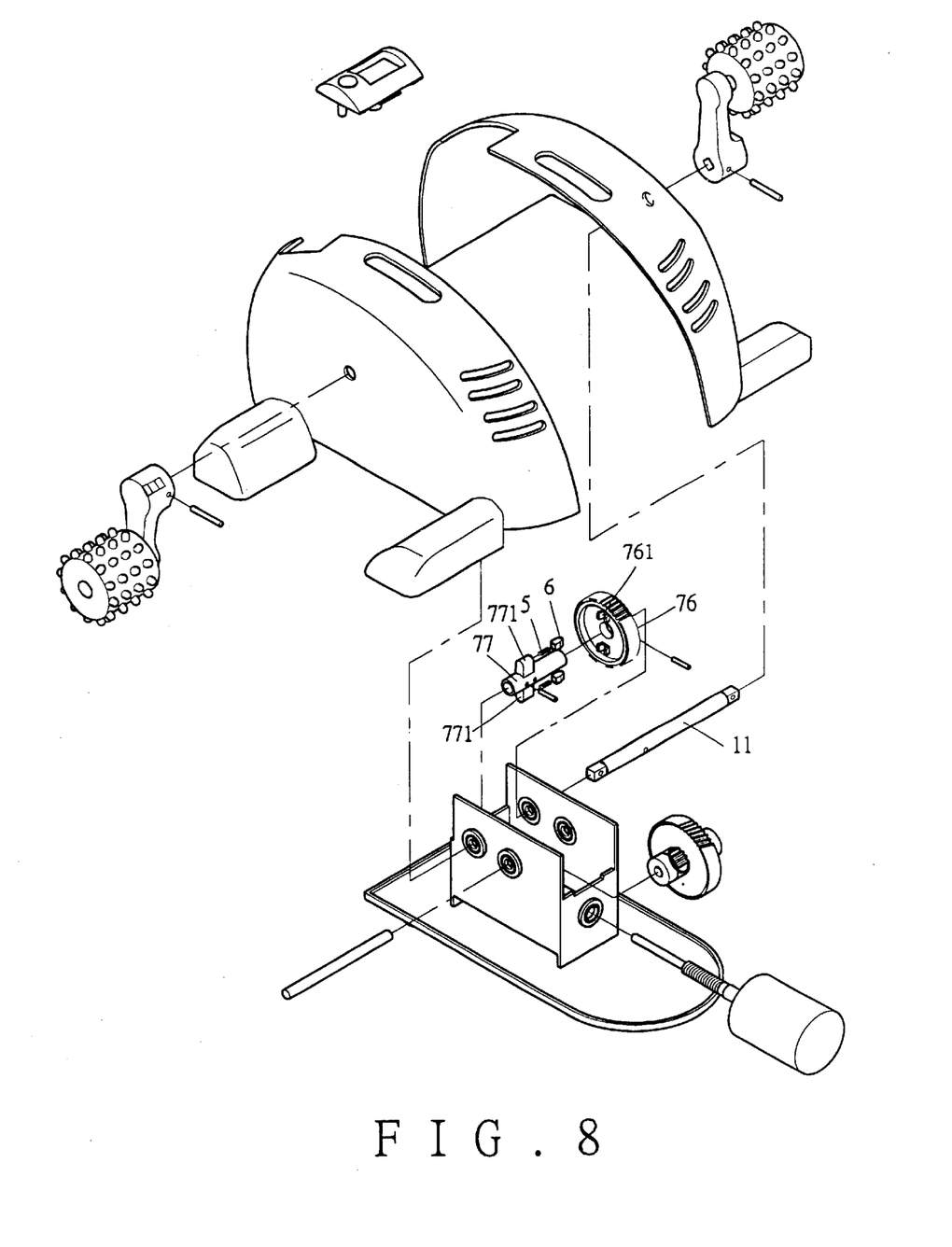
FIG. 8 is an exploded perspective view illustrating still another embodiment of the cycling exerciser in accordance with the present invention.
Figure 9:
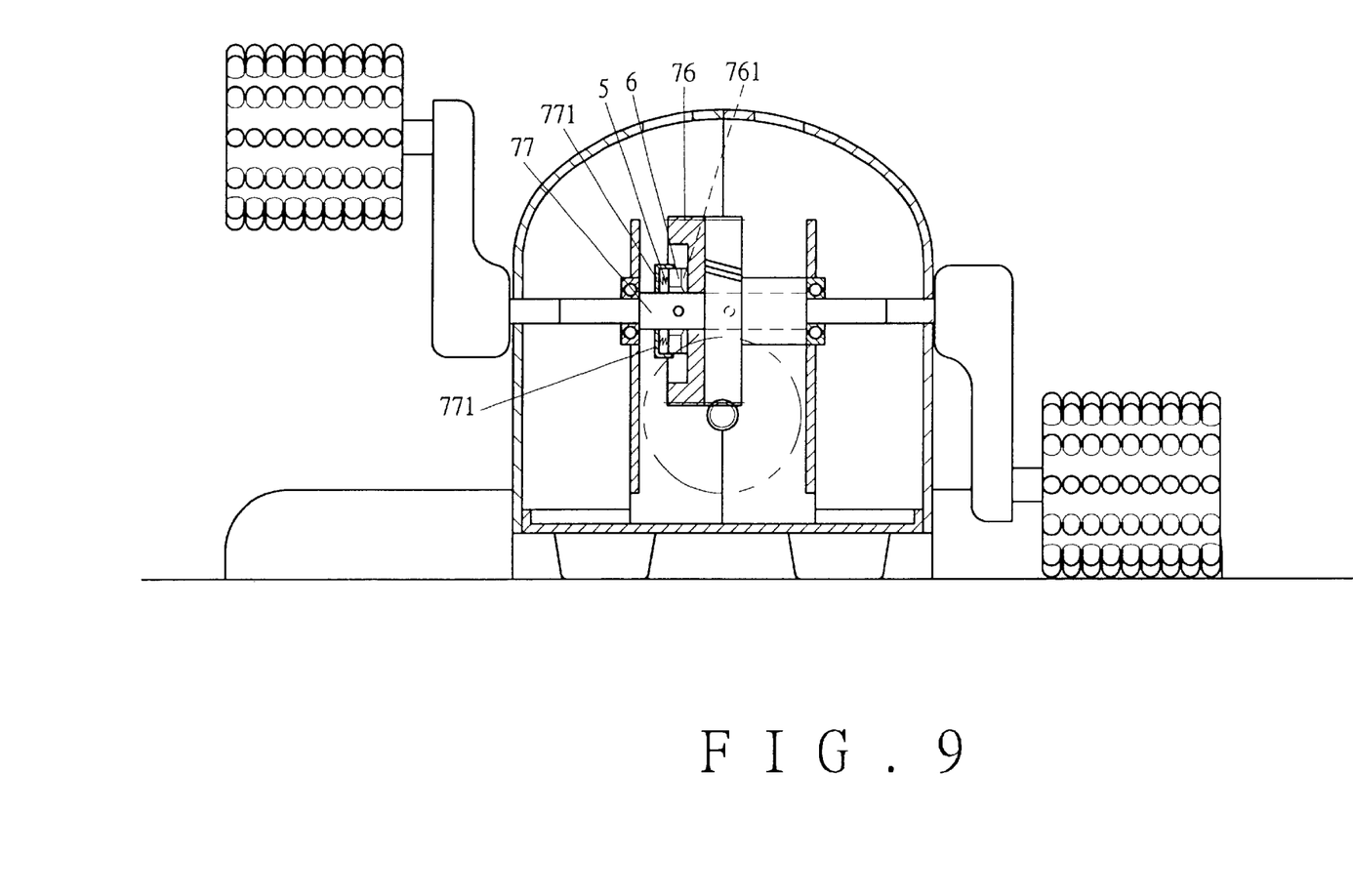
FIG. 9 is a sectional view of the cycling exerciser in FIG. 8.

FIGS. 8 and 9 illustrate still another embodiment of the invention, wherein the second gear (now designated by 76) has a pair of diametrically disposed insertion grooves 761 provided on a side of the second gear 76. A safety member 77 is securely mounted on the shaft 11 of the cycling exerciser to turn therewith. Two protrusions 771 are diametrically formed on the safety member 77. An elastic element 5 has a first end attached to a respective protrusion 771, and an insert 6 is attached to a second end of the elastic element 5. Operation of this embodiment is similar to that of the above embodiments.

Figure 10:
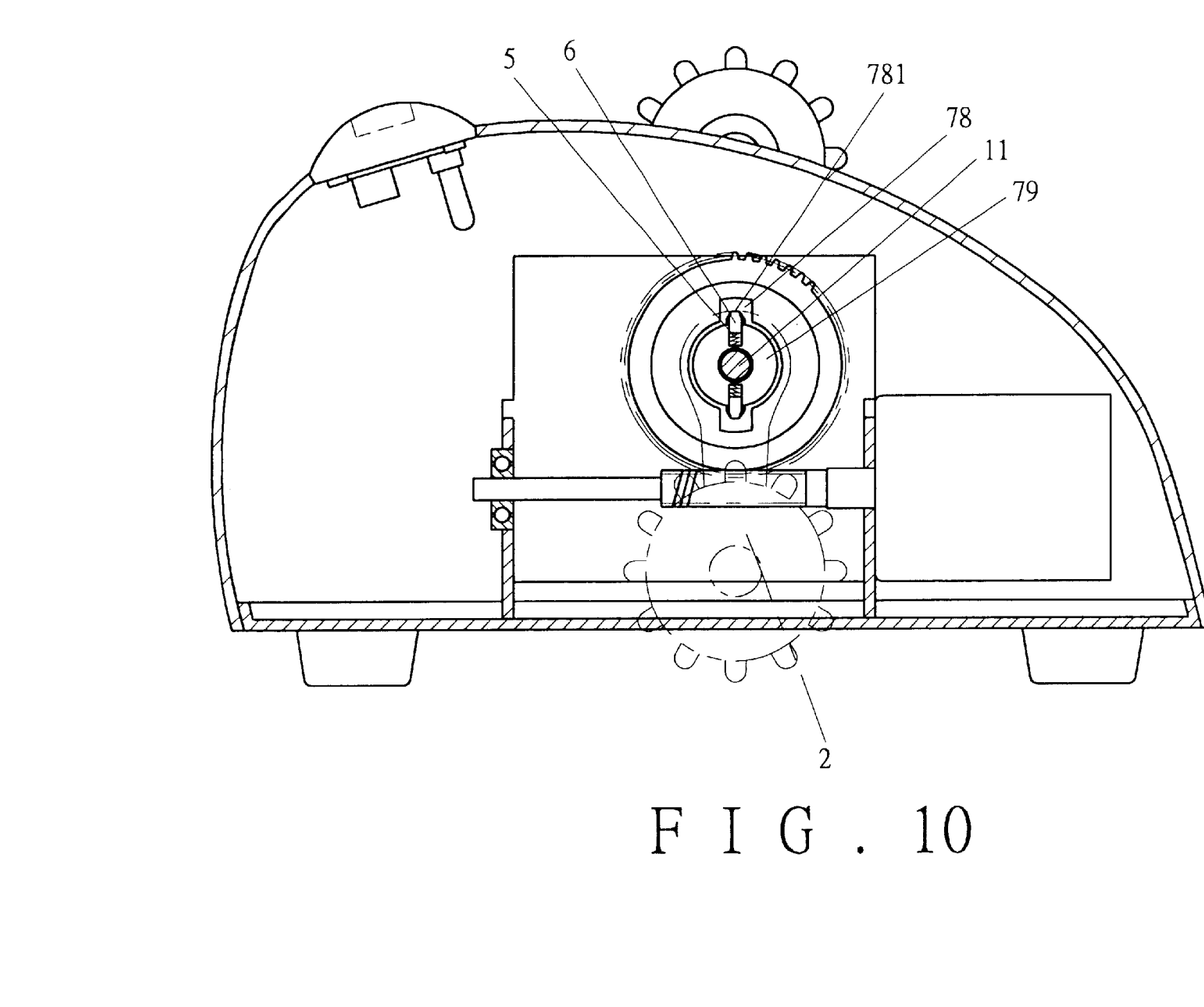
FIG. 10 is a sectional view illustrating yet another embodiment of the cycling exerciser in accordance with the present invention.

FIG. 10 illustrates yet another embodiment of the invention, wherein the cycling exerciser includes only one gear 78 rotatably mounted on the shaft 11. The gear 78 includes, e.g., two diametrically disposed insertion grooves 781. A wheel 79 is mounted in the gear 78 and includes two grooves (not labeled) each receiving an elastic element 5 and an insert 6 therein. The wheel 79 is securely mounted on the shaft 11 to turn therewith. Operation of this embodiment is similar to the above embodiments. Alternatively, the elastic elements 5 and the inserts 6 can be mounted in the gear 78, and the insertion grooves can be defined in the wheel 79 without adversely affecting its function. The wheels in FIGS. 1–7 and FIG. 10 can be deemed as a safety member. The gear train in FIGS. 1–9 can be replaced with other gear trains having more than two gears.

Although the invention has been explained in relation to its preferred embodiments, it is to be understood that many other possible modifications and variations can be made without departing from the scope of the invention as hereinafter claimed.

What is claimed is:

1. An electric cycling exerciser comprising:
   a housing;
   a shaft rotatably mounted to the housing;
   two pedals respectively operably attached to two ends of the shaft;
   a motor; and
   a gear rotatably mounted on the shaft and driven by the motor, the gear including a safety member rotatably mounted therein, the safety member being fixed to the shaft to turn therewith, one of the gear and the safety member including at least one groove for receiving an elastic element and an insert, the other of the gear and the safety member including at least one insertion groove for receiving the insert, the insert being biased by the elastic element into said at least one groove, thereby allowing joint rotation of the gear and the shaft;
   wherein when a user's foot is stuck between a respective pedal and the housing or the respective pedal is subject to a force greater than an engaging force between said at least one insertion groove and the insert, the insert is disengaged from said at least one insertion groove such that the shaft and the safety member are not turned while the gear is being turned.

2. An electric cycling exerciser comprising:

a housing;

a first shaft rotatably mounted to the housing;

a second shaft rotatably mounted to the housing;

two pedals respectively operably attached to two ends of one of the first shaft and the second shaft;

a motor; and a gear train including at least a first gear mounted to the first shaft and a second gear mounted to the second shaft, the first gear being meshed with the second gear, one of the first gear and the second gear being driven by the motor;

one of the first gear and the second gear including a safety member rotatably mounted therein, the safety member being fixed to an associated one of the first shaft and the second shaft to turn therewith, one of said one of the first gear and the second gear and the safety member including at least one groove for receiving an elastic element and an insert, the other of said one of the first gear and the second gear and the safety member including at least one insertion groove for receiving the insert, the insert being biased by the elastic element into said at least one groove, thereby allowing joint rotation of said one of the first gear and the second gear and an associated one of the first shaft and the second shaft;

wherein when a user's foot is stuck between a respective pedal and the housing or the respective pedal is subject to a force greater than an engaging force between said at least one insertion groove and the insert, the insert is disengaged from said at least one insertion groove such that the safety member and an associated one of the first shaft and the second shaft to which the pedals are mounted are not turned.

3. The electric cycling exerciser as claimed in claim 2, wherein the pedals are mounted on the second shaft.

4. The electric cycling exerciser as claimed in claim 3, wherein said safety member is mounted in the second gear, wherein said at least one groove for receiving the elastic element and the insert is defined in the safety member, and wherein said at least one insertion groove for releasably receiving the insert is defined in the second gear.

5. The electric cycling exerciser as claimed in claim 4, wherein the second gear includes a central hole for receiving the safety member, with said at least one groove being defined in an inner periphery defining the central hole of the second gear.

6. The electric cycling exerciser as claimed in claim 4, wherein said at least one insertion groove is formed on a side of the second gear.

7. The electric cycling exerciser as claimed in claim 3, wherein said safety member is defined in the second gear, wherein said at least one groove for receiving the elastic element and the insert is defined in the second gear, and wherein said at least one insertion groove for releasably receiving the insert is defined in the safety member.

8. The electric cycling exerciser as claimed in claim 3, wherein said safety member is defined in the first gear, wherein said at least one groove for receiving the elastic element and the insert is defined in the safety member, and wherein said at least one insertion groove for releasably receiving the insert is defined in the first gear.

* * * * *